Patented Jan. 5, 1937

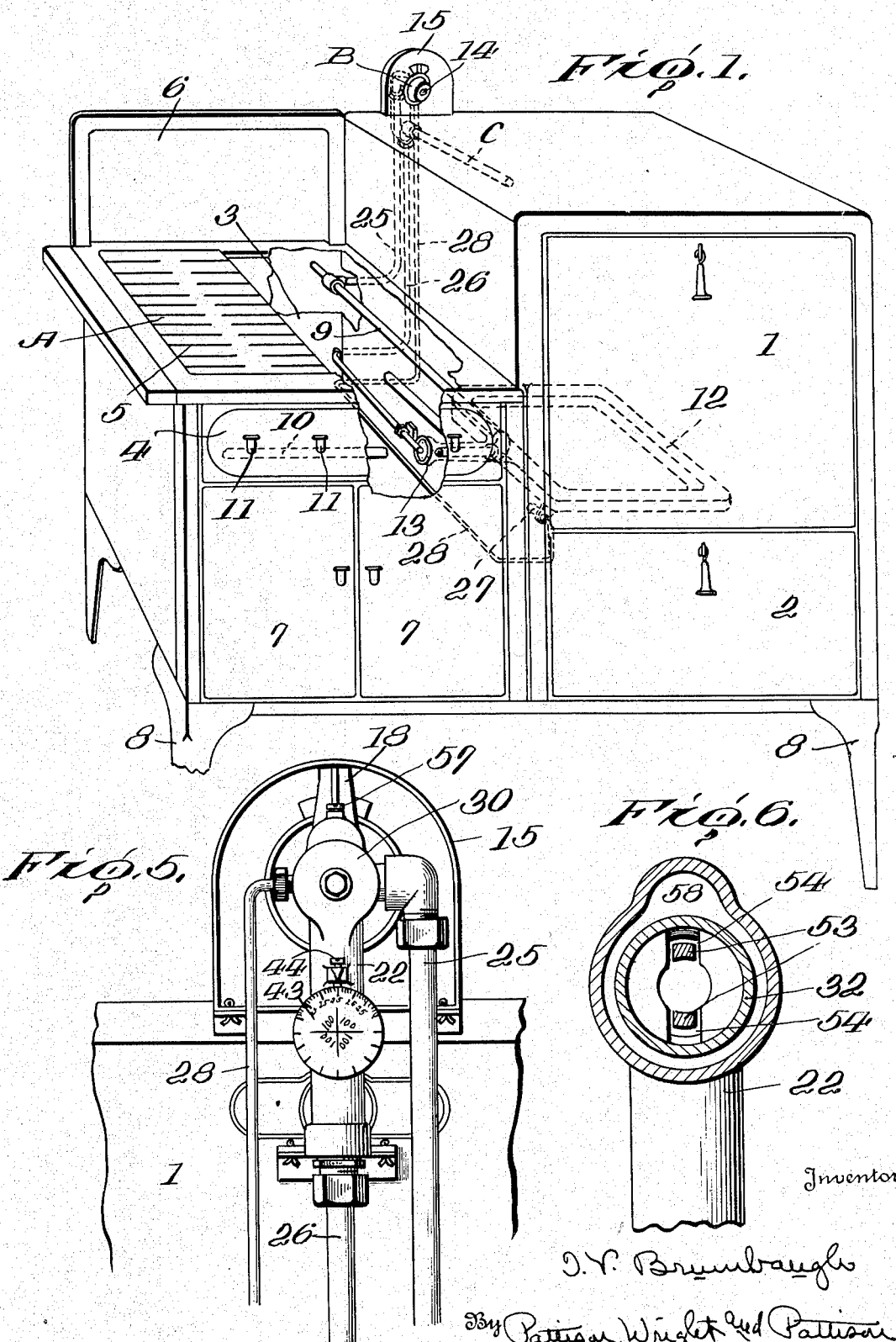

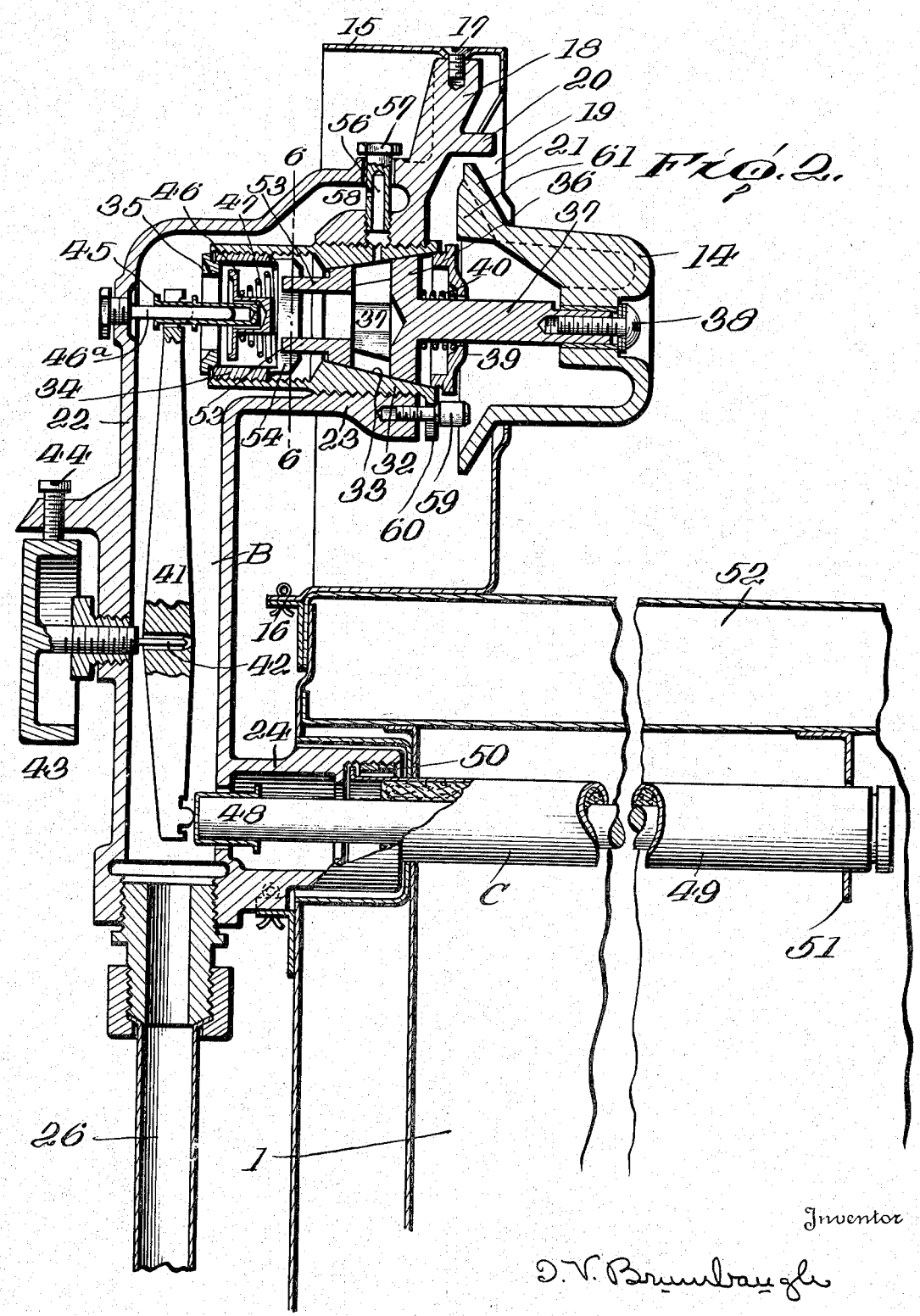

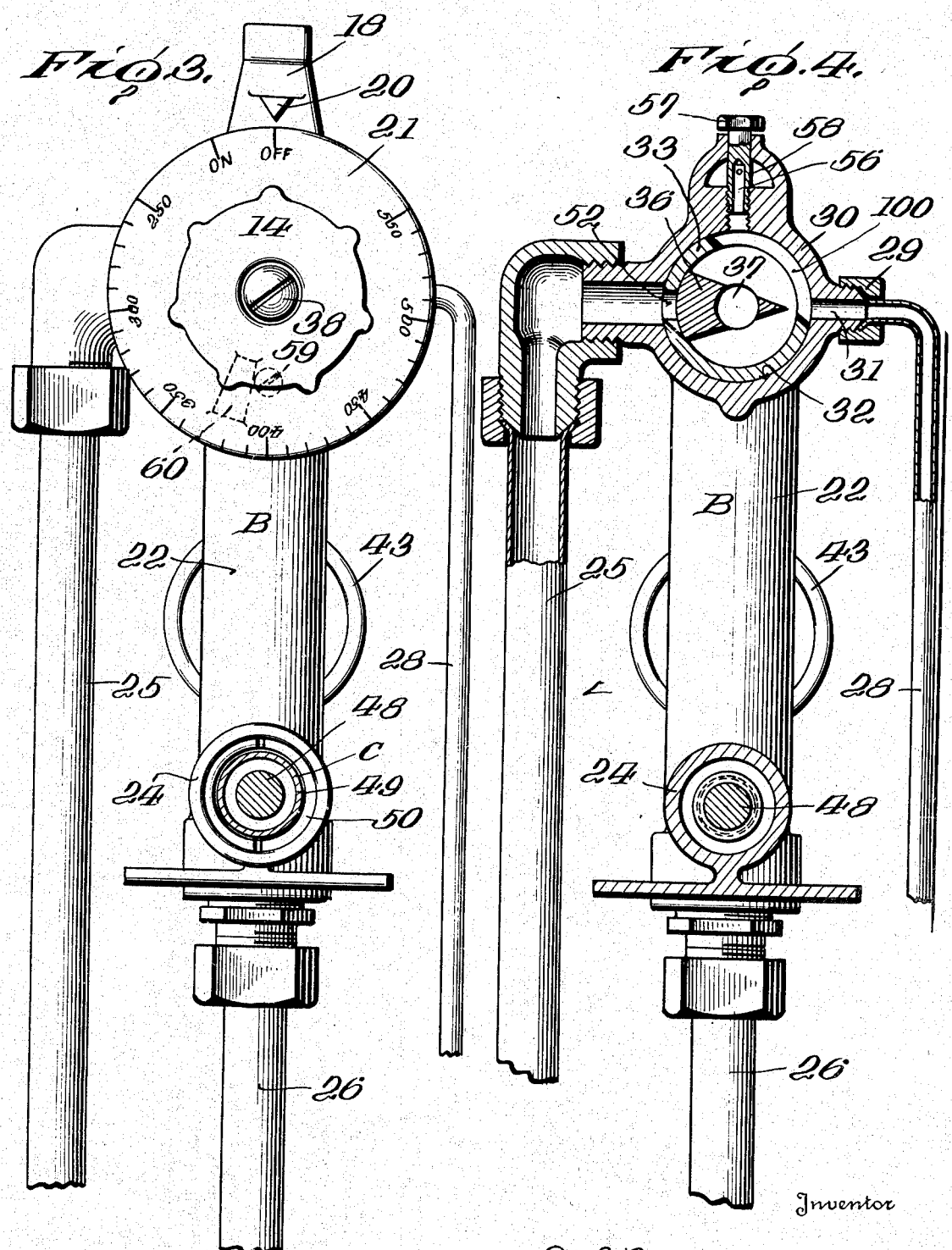

2,066,821

UNITED STATES PATENT OFFICE 2,066,821

THERMOSTATIC HEAT CONTROL FOR STOVE OVENS

Isaac Vernon Brumbaugh, St. Louis, Mo., assignor to American Stove Company, St. Louis, Mo., a corporation of New Jersey Application August 23, 1932, Serial No. 630,148

31 Claims. (Cl. 236—15)

This invention relates to an improvement in a thermostatic heat control for stove ovens and is of a type particularly adapted for use in connection with domestic gas cooking stoves or ranges.

The primary object of the invention is the provision of an improved thermostatic heat control for the ovens of gas cooking stoves.

Another object of the invention is the provision of a novel and improved combined gas cock and thermostatic regulator.

Another and further object of the invention is the provision of a combined gas cock and thermostatic regulator so constructed that the gas cock and the thermostatically operated gas valve can be removed as a unit from the regulator.

Another and further object of the invention is the novel arrangement and positioning of the parts going into the make-up of the heat control device.

Other specific objects, novel features of construction and improved results of the invention will appear from the following description based on the accompanying drawings, in which:

Figure 1 is a view in front elevation of a gas cooking range having applied thereto the present improved heat control.

Fig. 2 is a vertical sectional view through the upper rear end of the range oven and the combined gas cock and thermostatic heat regulator.

Fig. 3 is a front view of the combined heat regulator and gas cock.

Fig. 4 is a vertical sectional view through the combined gas cock and heat regulator, the section being taken at right angles to Figure 2.

Fig. 5 is a rear view of the combined gas cock and regulator.

Fig. 6 is a detailed vertical sectional view taken on the line 6—6 of Figure 2.

The present invention has been primarily conceived for the purpose of providing for a thermostatic heat control to automatically maintain in the oven of a gas cooking stove a given and set temperature by automatically controlling the delivery of gas to the oven burner.

The design and arrangement of parts is such as to provide a heat control which is particularly and especially adapted for use with gas cooking ranges built in accordance with the present day trend or vogue. The ovens of gas ranges as now manufactured are highly insulated, which makes it possible to place the oven of the range close to a kitchen wall without danger. This makes it impractical to place the heat regulator on the side or end wall of the oven. Additionally, many stoves are today provided with swinging or folding covers for the purpose of concealing the unsightly cooking top portion of the range, and therefore it is impractical to place the regulator on the side of the oven adjacent the cooking top portion of the range as here it would interfere with the movement of the concealing cover of this portion of the range.

Accordingly the present heat control mechanism has been especially designed to be positioned at and above the rear edge of the oven where it is easily and readily accessible even by a person of medium height for the reason that the vogue in present day ranges is to have the top of the oven approximately forty-three inches above the floor level. Thus there is no difficulty in reaching over the oven to the regulator to set it for the desired oven heat temperature.

The drawings illustrate one type of range which is now in very extensive use, and referring particularly to Figure 1 of the drawings, it will be seen that the ovens are designated as 1 and 2 and the cooking top portion of the range generally as A. The cooking top portion of the range comprises a burner chamber 3 the open front end of which is closed by a suitable plate 4 while the top of the chamber is provided with a grid 5 for the support of utensils. A folding combined cooking top cover and splash back is indicated at 6 and as is usually the case there is beneath the cooking top burner chamber a utensil storage space closed in by suitable doors 7. Supporting legs for the range are indicated at 8 and the main gas supply pipe 9 for the stove burners enters the rear of the cooking top burner chamber and extends forwardly through this chamber and across the front thereof as indicated at 10. The gas supply to the cooking top burners is under the control of suitable valves 11.

An oven burner is indicated at 12 and has the usual mixing tube 13 which in the present range extends through the oven side wall into the utensil storage space.

The combined heat regulator and gas valve is designated as an entirety by B and the thermostatic element by C.

By reference to Figure 2 of the drawings it will be seen that the combined regulator and gas cock or valve is positioned at and above the rear edge of the oven and that with the exception of its setting knob and dial 14 is concealed behind a suitable ornament or plate 15, the lower edge of which is secured as at 16 to the rear of the oven while its upper edge or top is secured by a suitable screw 17 to an extending portion 18 of the regulator housing. This concealing plate or ornament has an opening 19 in which the setting dial is rotatable and the thermostatic housing extension portion 18 carries a pointer 20 for cooperation with the dial portion 21 of the knob 14.

The regulator housing comprises a main vertically disposed housing portion 22 having at its upper end an internally threaded tubular extension 23 and at its lower end a tubular extension 24. Gas is conveyed to the regulator by a pipe 25 which has connection with the main gas supply manifold 9 and the main gas supply from the regulator is conveyed from the lower end of the vertically disposed housing portion 22 to the mixing tube 13 of the oven burner 12 by a pipe 26. A pilot light 27 is positioned in the oven adjacent the oven burner and receives its gas through a pipe 28 which is connected as at 29 to the tubular housing extension 30 and has communication with the interior thereof through an opening 31.

Within the tubular portion 23 of the regulator housing is rotatably mounted a sleeve 32 having in one end a tapered seat 33 while its other end threadedly receives and supports a collar 34 within the outer end of which is mounted a valve seat 35. The rotatable sleeve 32 might be well termed a gas cock barrel in that a tapered valve plug 36 is rotatably mounted within this barrel and is rotatable by having an extending stem 37 upon the outer end of which is removably mounted by means of a screw 38 the combined setting knob and dial 14 heretofore referred to. The end of the gas cock barrel is closed by a cap 39 against which bears a coil spring 40 which tends at all times to hold the tapered valve plug within its tapered seat.

Within the vertically disposed housing portion 22 of the regulator is positioned a lever 41 which is pivotally supported upon a pin 42 to the outer end of which is secured a calibrated adjusting dial 43 by means of which the fulcrum or pivotal supporting point of the lever can be adjusted. The adjusted position of the pin and adjustment dial is maintained by a set screw 44.

The upper end of the lever 41 is in operative engagement with a sleeve 45 which is reciprocable upon a pin 46ª which extends transverse the upper end of the main regulator housing portion 22. This sleeve 45 extends through the valve seat 35 and carries on its end a valve 46 which is normally held on the pin and in closed seating relation with the valve seat by a coil spring 47.

The lower end of the lever 41 is in engagement with the end 48 of a non-expansible rod which is a part of the thermostatic element C. This rod is arranged within a copper tube 49, one end of which is secured as at 50 to the tubular regulator housing 24 while its opposite end is supported by a bracket 51 with the result that the thermostatic element is positioned parallel with and in separated relation to the top 52 of the oven.

With a regulator of this type various oven temperatures are obtained and maintained by moving the valve seat 35 in respect to the thermostatically operated valve 46. To the end that this may be accomplished the gas valve or cock 36 is provided with a pair of extending prong-like members 53 the ends of which are in engagement with suitable slots 54, see Figure 6, in the end of the sleeve 34 in which the valve seat is mounted. Thus the sleeve or collar 34 is rotated by means of the combined knob and dial 14 to alter the position of the valve seat in respect to the thermostatically operated valve. Incidentally, as is probably clear from the foregoing description, when the knob 14 is rotated for a given heat temperature the dial is carried past the "on" position, which will permit the passage of gas from the inlet pipe 25 through the inlet opening 52 to the interior of the gas cock barrel 32 and the hollow interior of the plug valve 36. From this barrel the gas can flow through the pipe 28 to the oven pilot light and can also flow through the gas by-pass 56 which is in the threaded bolt 57. Gas passing through the by-pass bolt 57 will flow into the top-most portion 58 of the regulator housing and down the housing into the pipe 26 to the oven burner. Thus when the knob 14 is rotated to or past the "on" position the burner and its pilot light can be manually lighted. The dial 21 can then be set to the temperature it is desired to maintain in the oven and this temperature will be automatically maintained by the operation of the thermostat on the thermostatically operated valve.

Whenever the oven reaches the desired and set temperature the thermostat permits the gas valve 46 to close but a small flame will be maintained at the pilot and also at the oven burner as the oven burner will be at all times supplied with a small amount of gas through the by-pass opening.

It may be desirable for the purposes of repair or inspection to remove the combined gas cock and thermostatically operated valve as a unit and to this end these parts are secured within the tubular thermostatic housing portion 23 by a screw 59. By removing this screw and by removing the combined knob and dial 14 these members may be removed as a unit by merely removing the gas cock barrel 32. When the parts are removed in this manner the adjustment or calibrated setting of the parts will not be disturbed and it will be at once apparent that the sleeve 45 for operating the valve 46 will remain on the pin 46ª due to its connection with the upper end of the lever 41.

In devices of this kind to prevent them from getting out of adjustment means must be provided to prevent more than one complete rotation of the setting dial. In the present structure the rear face of the dial is provided with an extending stop member 61 which will engage the screw 59 and act as a stop against more than one complete rotation of the knob.

Attention is drawn to the fact that the gas cock barrel 32 has an opening or orifice 100 which is of a size or length to prevent the gas cock valve 36 from cutting off the flow of gas to either the by-pass orifice 56 or the pilot light supply pipe 28 when the regulator setting dial has been rotated to open the valve 36 and to set the regulator for a predetermined oven heat temperature.

A positioning of the combined gas cock and oven heat regulator at and above the rear edge of the oven is advantageous in that it removes the gas cock entirely from any heat zone of the stove which will insure that this valve will never bind or turn hard as is the case in respect to valves which are subjected constantly to heat from the stove burners.

Having thus described my invention what I claim and desire to secure by Letters Patent is:

1. For use with a stove having a burner, an automatic heat regulator comprising a housing having a chamber adapted for communication with a fuel supply pipe, said housing having communication with said burner, a reciprocable valve in said chamber controlling communication between the chamber and the housing, thermostatic means for opening said valve, a movably mounted seat for said valve, a rotatable tapered plug valve in said chamber for controlling the admission of fluid to the chamber, means to rotate said valve to open and close the same, and connection between said rotary valve and the seat of said reciprocable valve, whereby said valve seat is moved towards and away from the reciprocable valve when the rotatable valve is rotated.

2. For use with a stove having a burner, an automatic heat control therefor, comprising a housing having therein a chamber, said chamber adapted for communication with a fuel supply pipe and said housing having communication with the stove burner, a movable sleeve in said housing chamber, a reciprocable valve within the sleeve and a seat therefor carried by the sleeve, a rotary valve within the chamber for controlling the admission of gas to the chamber, thermostatically operated means for opening the reciprocable valve, manually operated means for operating the rotatable valve, a connection between the rotatable valve and the sleeve carrying the reciprocable valve seat, a by-pass connection between the chamber and the main housing, and a gas connection between the chamber and a pilot light for the burner, and the connection of the by-pass and the gas supply to the pilot light being in front of said thermostatically operated valve, for the purpose described.

3. For use with a stove having an oven and a burner therein, an automatic heat regulator comprising a housing having therein a pivotally mounted lever, a thermostatic element within the oven and having engagement with one end of said lever, a chamber within the housing, a reciprocable valve within the chamber, said valve on the same side of the lever as the thermostatic element and adapted to be operated by the end of the lever remote to the thermostat, a seat for said reciprocable valve and adjustable in respect thereto, a fuel supply pipe communicating with said chamber, a manually operatable valve controlling the admission of fuel to said chamber, an operatable connection between said manually operated valve and the seat of said reciprocable valve to cause them to move in unison, and means to simultaneously operate said manually operatable valve and set the heat control at the desired temperature.

4. For use with a stove having an oven and a burner therein, an automatic heat regulator comprising a housing having therein a pivotally mounted lever, a thermostatic element within the oven and having engagement with one end of said lever, a chamber within the housing, a reciprocable valve within the chamber, said valve on the same side of the lever as the thermostatic element and adapted to be operated by the end of the lever remote to the thermostat, a seat for said reciprocable valve and adjustable in respect thereto, a fuel supply pipe communicating with said chamber, a manually operatable valve controlling the admission of fuel to said chamber, an operatable connection between said manually operated valve and the seat of said reciprocable valve to cause them to move in unison, means to simultaneously operate said manually operatable valve and set the heat control at the desired temperature, a fuel by-pass connection between said chamber and said housing around said reciprocable and thermostatically operated valve, and a gas connection between said chamber and a pilot light for said burner, the parts being arranged for the purpose described.

5. For use with a stove having a burner, an automatic heat regulator comprising a housing having therein a chamber, said chamber adapted for communication with a fuel supply pipe and communication with said housing, said housing having communication with the burner, said chamber comprising a gas cock barrel threadedly mounted in the housing, a sleeve carrying a valve seat threadedly mounted in said barrel, a thermostatically operated valve co-operating with said seat and positioned within said sleeve, a tapered valve seat in said barrel, a plug valve within said tapered seat for controlling the admission of gas to the interior of the barrel comprising said chamber, a connection between said plug valve and said sleeve carrying said thermostatic valve seat, means to manually operate said plug valve and simultaneously move the seat of the thermostatically operated valve, and said gas cock barrel and its associated parts removable as a unit from the housing of the regulator, for the purpose described.

6. The combination with a stove having an oven and a burner therein, of an automatic heat regulator comprising a housing constituting a part of the fuel supply line to said burner, said housing at one end adapted for communication with a fuel supply pipe, a manually operated valve controlling the passage of fuel through said pipe, a thermostatically operated valve for controlling the flow of fuel through the housing, a thermostatic element within the oven and having operatable connection with said thermostatically operated valve, said valves and said thermostatic element both positioned at the same side of said housing, and said regulator including the housing and valves positioned at and above the rear edge of the oven, for the purpose described.

7. For use with a stove having a burner, an automatic heat control therefor, comprising a housing having therein a chamber adapted for communication with a fuel supply pipe and having communication with the stove burner, a movable sleeve in said housing chamber, a reciprocable valve within the sleeve and a seat therefor carried by the sleeve, a rotary tapered plug valve in axial alignment with said lever and also within the chamber for controlling the admission of gas to the chamber, thermostatically operated means for opening the reciprocable valve, manually operatable means for operating the rotatable valve, and a connection between the rotatable valve and the sleeve carrying the reciprocable valve seat.

8. For use with a stove having a burner, an automatic heat regulator comprising a housing having therein a pivotally mounted lever, a thermostatic element positioned to be affected by the heat from said burner and having engagement with one end of said lever, a chamber within the housing, a valve in the chamber operatable by said lever, said valve on the same side of the lever as the thermostatic element and adapted to be operated by the end of the lever remote to the thermostat, a seat for said valve and adjustable in respect thereto, a fuel supply pipe communicating with said chamber, a manually operatable valve controlling the admission of fuel to said chamber, an operatable connection between said manually operated valve and the seat of said thermostatically operated valve to cause them to move in unison, and means to simultaneously operate said manually operatable valve and to set the heat control at the desired temperature.

9. For use with a stove having a burner, an automatic heat regulator comprising a housing having therein a chamber, said chamber adapted for communication with a fuel supply pipe and communication with said housing, said housing having communication with the burner, said chamber comprising a gas cock barrel removably mounted in the housing, a valve seat adjustably mounted in said barrel, a thermostatically operated valve cooperating with said seat and positioned within said barrel, a second valve seat in said barrel, a rotary plug valve cooperating with said second valve seat for controlling the admission of fuel to the interior of the barrel comprising said chamber, a connection between said rotary valve and the adjustable valve seat for the thermostatically operated valve, and means to manually operate said rotary valve and simultaneously move the seat of the thermostatically operated valve, for the purpose described.

10. An improved automatic heat regulator for an oven having a burner, comprising a thermostatically operated valve for controlling the admission of fuel to said burner, a lever pivotally mounted intermediate its ends and having connection at one end with said valve and in operative engagement at its opposite end with the thermostatic element, a fulcrum for pivotally supporting said lever, a member for setting the regulator to maintain in the oven any desired temperature and a second member having connection with said fulcrum for adjusting the pressure under which said lever engages the valve and the thermostatic element, for the purpose described.

11. An improved automatic heat regulator of the construction defined in claim 10, wherein there is a locking means for engaging and securing the fulcrum adjusting member in its adjusted position.

12. The combination with a stove having a burner, of an automatic heat regulator comprising a housing constituting a part of the fuel supply line to said burner, a manually operatable valve controlling the admission of fuel to the regulator housing and a thermostatically operated valve for controlling the passage of fuel from the regulator housing, a movable seat for said thermostatically operated valve, operative connection between the manually operatable valve and said movable seat whereby said seat is adjusted when said manually operatable valve is operated, a thermostatic element positioned within the heat zone of said burner and having operatable connection with said thermostatically operated valve, and all of said valves and the said thermostatic element positioned at the same side of said housing, for the purpose described.

13. The combination with a stove having an oven and a burner therein, of an automatic heat regulator comprising a housing constituting a part of the fuel supply line to said burner, a thermostatic element horizontally disposed within the oven, a manually operatable valve controlling the admission of fuel to the housing, a thermostatically operated valve for controlling the flow of fuel from the housing, an operatable connection between said thermostatic element and said thermostatically operated valve, and said regulator including the housing and valves positioned at a point above the thermostatic element, for the purpose described.

14. The combination with a stove having an oven and a burner therein, of an automatic heat regulator comprising a housing constituting a part of the fuel supply line to said burner, a manually operatable valve controlling the admission of fuel to the housing, a thermostatically operated valve for controlling the passage of fuel from the housing, a thermostatic element horizontally disposed within the oven and having operatable connection with said thermostatically operated valve, and said regulator in its entirety including said valves positioned at and above the rear edge of the oven and above the thermostatic element, for the purpose described.

15. A burner, an automatic fuel valve for said burner, a rotatably adjustable seat for said valve, a second and rotatable tapered plug fuel valve having a single manually operated rotatable member engaging said second fuel valve and the seat of said automatic fuel valve, whereby the rotatable valve and the adjustable seat for the automatic valve are operated by rotating said single member, for the purpose described.

16. The combination with a stove having a burner, a thermostatic regulator for controlling the flow of fuel to said burner comprising a housing having therein a removable chamber, a manually operated valve for controlling the admission of fuel to the chamber and an automatic valve for controlling the passage of fuel from the chamber, both of said valves being mounted within the chamber and having valve seats, a manually rotatable operating means for operating said manual valve, a lock for locking the chamber within the housing, and said lock cooperating with said manual operating means to act as a stop to prevent more than one complete rotation of said means.

17. For use with a stove having a burner, an automatic heat control, comprising a chamber adapted for communication with a fuel supply pipe and adapted for communication with the stove burner, a rotatably adjustable valve seat within said chamber, a valve cooperating with said seat for controlling the flow of fuel from the chamber to the burner, thermostatically operated means for operating said valve, a second valve seat in said chamber, a rotary valve in said seat for controlling the admission of fuel to the chamber, an operative connection between the rotary valve and the adjustable valve seat, and means to operate said rotary valve, for the purpose described.

18. For use with a stove having a burner, an automatic heat regulator, comprising a thermostatic element positioned to be affected by the heat from said burner, a chamber having a fuel inlet and a fuel outlet communicating with said burner, a valve controlling the fuel outlet, an operative connection between the thermostatic element and said valve, a movable seat for said valve, a valve for controlling the inlet of fuel to the chamber, an operative connection between said fuel inlet control valve and said movable valve seat, means to operate said fuel inlet control valve, and both of said valves, their seats and the fuel inlet control valve operating means and said thermostatic element positioned on the same side of the means interconnecting the thermostatic element and the fuel outlet control valve.

19. A thermostatic fuel control, comprising a housing having gas inlets and outlets, a valve seat and a valve rotatable therein for controlling the gas inlet, a second valve for controlling the passage of gas through the housing, a rotatably adjustable seat for said second valve, a thermostatic means for actuating said second valve, a driving connection between the rotary valve and the rotatably adjustable seat for moving the seat towards and away from its valve, and means to operate the rotatable valve, for the purpose described.

20. An improved thermostatic fuel control as defined in claim 19, wherein there is a fuel by-pass around the second valve to supply a constant flow of gas through the housing when the rotary inlet valve is open, and the flow of gas to said by-pass is cut off by the rotary inlet valve when said valve is in a closed position.

21. An improved thermostatic fuel control as defined in claim 19, wherein there is a fuel by-pass around the second valve for the delivery of gas at all times to a burner and there is a second fuel by-pass around the said second valve for supplying fuel at all times to a burner pilot light when the rotary fuel inlet valve is open, and said rotary inlet valve shutting off the supply of gas to both of said by-passes when said rotary inlet valve is closed.

22. For use with a stove having a burner, an automatic heat control therefor, comprising a housing having therein a chamber adapted for communication with a fuel supply pipe and having communication with the stove burner, a rotatably adjustable sleeve in said housing chamber, a reciprocable valve within the sleeve and a seat therefor carried by the sleeve, a rotary valve within the sleeve for controlling the admission of gas to the chamber, thermostatically operated means for opening the reciprocable valve, manually operatable means for operating the rotatable valve, and a connection between the rotatable valve and the rotatably adjustable sleeve carrying the reciprocable valve seat.

23. In a thermostatic fuel control having a thermostatic element positioned in the heat zone of the heat to be controlled, a burner, a fuel conduit for said burner, a sleeve removably mounted in said conduit and carrying a pair of valve seats, a manually operatable valve cooperating with one seat and a thermostatically operated valve cooperating with the other seat, the manual valve controlling the admission of fuel and the thermostatic valve controlling the outlet of fuel from the conduit, and said sleeve and valves being removable as a unit from said conduit, for the purpose described.

24. In a thermostatic fuel control, a fuel conduit, a sleeve mounted in said conduit and rotatably removable therefrom and carrying a pair of valve seats, a valve cooperating with each seat, one of said valves controlling the inlet of fuel to said conduit, the other valve being thermostatically operated and controlling the outlet of fuel from said conduit, and said sleeve and valves being removable as a unit from said conduit, for the purpose described.

25. In a thermostatic fuel control, a fuel conduit, a sleeve mounted in said conduit and carrying a pair of valve seats, one of said valve seats being fixed and the other valve seat being adjustable in said sleeve, a pair of valves cooperating with said seats, the valve in the fixed seat being a rotatable manually operated valve and having connection with the movable valve seat of the other valve for adjusting said seat, the other valve being thermostatically operated, the manual valve controlling the inlet of fuel and the thermostatically operated valve controlling the outlet of fuel, an operating handle for the manual valve, and said sleeve, its valves and the operating handle for the manual valve being removable as a unit from said conduit, for the purpose described.

26. An improved thermostatic fuel control, comprising a U-shaped housing having a fuel inlet and a fuel outlet, a thermo-element supported in one leg of the housing, a manually operatable valve positioned in the other leg of the housing for controlling the inlet of fuel thereto, a second valve within the housing for controlling the passage of fuel therefrom, means operatively interconnecting the thermo-element and the second valve, and both of said valves being supported within a carrier and said carrier and valves being removable as a unit from the housing.

27. A structure such as defined in claim 26, wherein the seat for the second valve is movable and there is an operative connection between said seat and the fuel inlet control valve to provide a temperature setting for the control device.

28. An improved thermostatic valve control, comprising a conduit having a fuel inlet and fuel outlet, a thermo-element and a manually operatable valve and its operating means supported upon and positioned at the same side of said conduit, a second valve for controlling the passage of fuel from the conduit, means operatively connecting the thermo-element and the second valve, a carrier for both of said valves, and said carrier and valves removable as a unit from the conduit.

29. A structure such as defined in claim 28, wherein the seat for the second valve is movable and there is an operative connection between said seat and the manually operated fuel control valve to provide a temperature setting means for the control device.

30. An improved thermostatic fuel control, comprising a conduit having a fuel inlet and a fuel outlet, a thermo-element, a manually operated valve for controlling the admission of fuel, a second valve for controlling the passage of fuel from the conduit, operative means interconnecting the thermo-element and the second valve, and said thermo-element, the second valve and manually operated valve being positioned on the same side of the operative means which interconnect said thermo-element and said second valve.

31. For use with a stove having a burner, an automatic heat control, comprising a chamber adapted for communication with a fuel supply pipe and with the stove burner, an adjustable sleeve in said chamber, a thermostatically operated valve within the sleeve and a seat therefor, a second and manually operated valve within the sleeve, a thermostat for operating said first-named valve, manually operatable means for operating said second valve, and a connection between the manual valve and the adjustable sleeve carrying the seat of the thermostatically operated valve, the parts operating for the purpose described.

ISAAC VERNON BRUMBAUGH.